United States Patent Office 3,090,820
Patented May 21, 1963

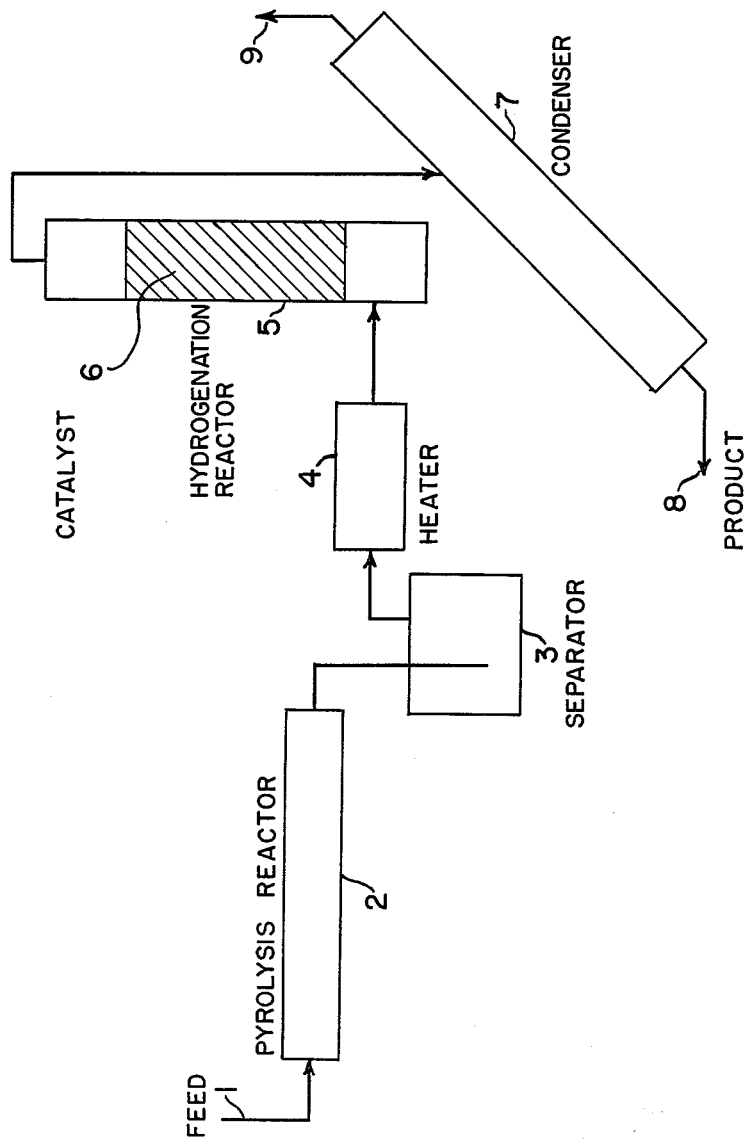

3,090,820
RECOVERY OF AROMATIC HYDROCARBONS
Harry M. Walker, Dickinson, Tex., assignor to Monsanto Chemical Company, St. Louis, Mo., a corporation of Delaware
Filed Nov. 21, 1960, Ser. No. 70,555
4 Claims. (Cl. 260—667)

This invention relates to a method for recovering aromatic hydrocarbons from tar residues. More particularly, it relates to the recovery of alkylbenzenes from the distillation residue of a styrene purification system.

It is well known that in the manufacture of styrene from ethylbenzene by the steps of dehydrogenating the ethylbenzene and separating the styrene from unreacted ethylbenzene by distillation, millions of pounds of distillation residues are produced annually as by-products for which no uses, other than as fuel, have been found. These residues are gross mixtures having broad distillation ranges and generally distilling above 150° C. They are usually made up of residues from the purification of ethylbenzene and the residues from the purification of styrene but because the ethylbenzene residue is frequently used as an additive in the styrene purification, the residue is collected as one mixture from the styrene distillation columns. For the purposes of this application, styrene distillation residues will be defined as the bottoms fraction from the last column in a distillation train wherein a reaction mixture obtained from the dehydrogenation of ethylbenzene containing styrene monomer, ethylbenzene, benzene and minor amounts of aromatic by-products is distilled with benzene, ethylbenzene and styrene being recovered, respectively. This mixture, although quite variable in composition, generally contains polyethylbenzenes, a styrene-sulfur reaction product, and polystyrene in major proportions and free sulfur, styrene monomer, and other aromatic compounds in minor proportions.

Because of the presence of the sulfur in the mixture, the demand for the residue as a fuel is very limited. Only in isolated locations can a fuel containing sulfur be used without undesirable combustion fumes contaminating a residential area. For this reason, the distillation residues have heretofore had little or no economic value. Furthermore, since there has been no method with practical economics for separating the valuable components from the undesirable components, the residues have actually created a waste disposal problem costing thousands of dollars a year.

It is, therefore, an object of this invention to provide a process for the recovery of valuable aromatic hydrocarbons from styrene distillation residues. A further object of this invention is to eliminate the undesirable sulfur compounds from the styrene residues. Another object is to convert the styrene polymer to styrene monomer and aromatic hydrocarbons and recover these compounds. These and other objects of the invention will become apparent from the following description.

In fulfillment of these objects of the invention, styrene distillation residues consisting of polyethylbenzenes, polystyrenes, styrene-sulfur products, free sulfur, and minor amounts of other aromatic hydrocarbons are subjected to pyrolysis in the presence of steam and hydrogen at elevated temperatures and pressures, and the pyrolysis vapors are then subjected to hydrogenation at elevated temperatures and pressures in the presence of a hydrodesulfurization or hydrogenation catalyst to produce substantially pure aromatic hydrocarbons which can be separated by conventional distillation techniques.

In the pyrolysis or vaporization step, complete decomposition of the polystyrene occurs giving styrene vapors. The other components in the feed also vaporize giving polyethylbenzene vapors, styrene-sulfur product vapors, and sulfur vapors. In the catalytic hydrogenation step, reaction occurs between hydrogen and the sulfur present to form hydrogen sulfide. This results in some sulfur-free organic compounds such as polyethylbenzene. Furthermore, a dealkylation and hydrodealkylation of polyethylbenzenes take place to a considerable extent producing ethylbenzene and benzene plus gaseous by-products. The effluent from the catalytic bed, predominantly hydrogen, hydrogen sulfide, and steam, is condensed and the hydrogen and hydrogen sulfide streams are purged from the system along with methane and other light hydrocarbon gases manufactured in the system.

The accompanying drawing shows a block flow diagram of the process of this invention. The feed material 1, from the styrene distillation residues plus hydrogen enters a vessel 2, to undergo the pyrolysis reaction. The effluent from this reaction passes through a coke separator 3, and a heater 4, before entering the catalytic hydrogenation reactor 5, to contact the catalyst pellets 6. The reaction products from the reactor 5, are condensed in a water cooler 7, and are collected as liquid from the condenser bottom outlet 8. Uncondensed gases are vented from the top of the water cooler 9, to the atmosphere.

The following examples are illustrative of the invention but should not be construed as limiting it in any manner.

Example I

Styrene distillation residues and tars are pumped at a rate of 5 grams per minute into a section of pipe 4 feet long and ⅜ inch in diameter along with water at one gram per minute and hydrogen at a rate of 27 liters per minute at standard conditions. The pipe is heated to 1000° F. by means of an electrical heater. The pressure in the pipe is maintained at 1000 p.s.i. The effluent from the pipe heater discharges into a one-quart steel vessel acting as a coke separator. The vapors from the separator are directed through a coil of ⅜-inch steel pipe heated by a gas flame. The vapors then enter a hydrogenation reactor consisting of a section of 2-inch pipe 18 inches long. The reactor is packed with catalyst pellets consisting of 3% cobaltous oxide, 9% molybdenum oxide, and 0.2% sodium hydroxide on an alumina support. The reactor temperature is 900° F. The effluent from the reactor is cooled in a water condenser which is connected to a steel product receiver. Uncondensed hydrogen and some hydrogen sulfide from the condenser are vented through a control valve which maintains a constant back pressure of 1000 p.s.i. on the system. The reaction product recovered from the condenser consists of benzene, toluene, ethylbenzene, polyethylbenzene, and styrene plus traces of cumene and methylstyrene.

Example II

A run is made with the identical feed and process conditions as in Example I except that no hydrogen is fed to the pipe heater. The product obtained is the same as in Example I except that approximately 10% to 20% of the total feed is deposited in the heater and separator as coke.

Example III

A run is made with the identical feed and process conditions as in Example I except that the operating pressure throughout the process is 30 p.s.i. The final product has substantially the same composition as in Example I except that approximately 50% of the total feed is deposited throughout the heater, separator, and coil as coke.

It is important that the hydrogen be added before the pyrolysis step rather than just prior to the hydrogenation reactor because although the pyrolysis reaction is principally decomposition of the constituents by heat, the hydrogen acts to reduce coke formation and is also valuable as a carrier.

If, however, conditions are employed such that coke formation is not a serious problem, then it may be desirable to vent hydrogen sulfide manufactured in the pyrolysis reaction prior to the hydrogenation step and inject hydrogen at that point to feed directly to the hydrogenation reactor.

The pyrolysis and the hydrogenation reactions of this invention can be conducted at temperatures in the range from 500° to 1500° F. However, temperatures in the range from 800° to 1100° F. are preferred. Operating pressures from about 300 p.s.i. to 1500 p.s.i. are suitable in this invention for both the pyrolysis and the hydrogenation reaction. For the best results, though, pressures from about 700 to 1200 p.s.i. are most desirable.

It has been found that variable amounts of hydrogen can be used with the feed stream with satisfactory results being achieved, but the preferred hydrogen concentration for the most effective utilization in this invention is from about 2 to about 8 pounds of hydrogen per 100 pounds of styrene residue fed. Similarly, the process of this invention is most efficiently conducted when the steam added with the styrene residue feed is from about 10 to about 30 pounds of steam per 100 pounds of styrene residue.

The condensed aromatic product containing benzene, ethylbenzene, polyethylbenzene, toluene, and styrene can easily be separated and thus this product can be recycled with the normal dehydrogenation effluent in a conventional styrene plant. Consequently no separate distillation facilities for this aromatic product would be required which makes for low capital expenditures in the installation of this invention.

It is important in the practice of this invention to conduct the process in a manner which permits substantially complete vaporization of the feed so that the pyrolysis reaction can go to completion and so that the catalytic hydrogenation can be conducted most efficiently. Any type of tubular reaction chamber can be employed for the pyrolysis reaction to accomplish the desired vaporization such as a gas fired furnace, electrically heated furnace tubes, or a superheated steam heat-exchanger.

The preferred catalyst for the hydrogenation or hydrodesulfurization, that is, removal of sulfur by hydrogenation, reaction of this invention is a mixture of cobaltous oxide and molybdenum oxide, commonly referred to as cobalt-molybdate. However the process can be practiced in a successful manner with any suitable hydrogenation or hydrocracking catalyst such as tungsten sulfide, supported chromia, nickel sulfide, iron-chromium oxide combinations, and other similar materials. It is preferred that the catalyst be supported on a carrier such as alumina, silica, silica-alumina combinations, diatomaceous earth, magnesia, or other inorganic oxides either alone or in combination. Promoters and modifiers are also beneficial. In addition, pretreatment of the support material with hydrogen fluoride or other acidic materials enhances the hydrogenation activity of the catalyst and is desirable. Alumina modified with silica is the suggested choice in this invention.

What is claimed is:

1. The process for the recovery of valuable aromatic hydrocarbons from styrene distillation residues which comprises subjecting said residues to pyrolysis in the presence of steam and hydrogen at a temperature in the range from about 500° to about 1500° F. and a pressure in the range from about 300 to about 1500 p.s.i., hydrogenating the gaseous pyrolysis product in the presence of a hydrogenation catalyst at elevated temperatures and pressures, and recovering the liquid aromatic product by condensation.

2. The process as described in claim 1 wherein the steam added with the styrene distillation residues is from about 10 to about 50 pounds of steam per 100 pounds of styrene distillation residues.

3. The process as described in claim 1 wherein the hydrogen added is from about 2 to about 8 pounds of hydrogen per 100 pounds of styrene distillation residues.

4. The process as described in claim 1 wherein the catalyst is a cobalt-molybdate.

References Cited in the file of this patent
UNITED STATES PATENTS

| | | |
|---|---|---|
| 1,965,956 | Dunkel et al. | July 10, 1934 |
| 2,758,957 | Nozaki | Aug. 14, 1956 |
| 2,846,479 | Saunders et al. | Aug. 5, 1958 |